United States Patent
Murata et al.

(10) Patent No.: US 7,804,811 B2
(45) Date of Patent: Sep. 28, 2010

(54) METHOD OF DETECTING ERROR OF CONTROL INFORMATION TO BE TRANSMITTED BY DOWNLINK CHANNEL OF RADIO COMMUNICATION AND MOBILE TERMINAL

(75) Inventors: Syuuichi Murata, Kawasaki (JP); Koji Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 897 days.

(21) Appl. No.: 11/168,359

(22) Filed: Jun. 29, 2005

(65) Prior Publication Data
US 2006/0215705 A1    Sep. 28, 2006

(30) Foreign Application Priority Data
Mar. 28, 2005    (JP)    ................ 2005-092831

(51) Int. Cl.
*H04B 7/216* (2006.01)

(52) U.S. Cl. .............. 370/342; 370/310; 370/335; 370/441

(58) Field of Classification Search ........... 370/310, 370/349, 503, 329, 335, 333, 341, 342, 343, 370/344, 350, 431, 432; 375/147, 152, 259, 375/265; 455/421, 445, 451, 450, 452.1, 455/522; 714/748, 100, 48, 49, 52, 699, 714/723, 746, 758, 798
See application file for complete search history.

(56) References Cited

U.S. PATENT DOCUMENTS

| | | | |
|---|---|---|---|
| 6,842,491 B2 * | 1/2005 | Gelblum et al. .............. 375/265 |
| 2002/0149496 A1 * | 10/2002 | Dabak et al. ........... 340/825.56 |
| 2003/0103481 A1 * | 6/2003 | Heo et al. ................... 370/335 |
| 2003/0133497 A1 * | 7/2003 | Kinjo et al. .................. 375/152 |
| 2003/0159100 A1 * | 8/2003 | Buckley et al. ............. 714/758 |
| 2003/0179778 A1 * | 9/2003 | Guanter et al. ............. 370/503 |
| 2003/0192004 A1 * | 10/2003 | Gopalakrishnan ........... 714/758 |
| 2004/0001555 A1 * | 1/2004 | Taffin et al. ................. 375/261 |
| 2004/0059978 A1 * | 3/2004 | Subrahmanya ............. 714/748 |
| 2004/0062221 A1 * | 4/2004 | Gopalakrishnan et al. ... 370/335 |
| 2004/0077368 A1 * | 4/2004 | Anderson .................... 455/522 |
| 2004/0187069 A1 | 9/2004 | Pietraski et al. |
| 2004/0223473 A1 * | 11/2004 | Ha et al. ..................... 370/335 |
| 2005/0073973 A1 * | 4/2005 | Laroia et al. ................ 370/329 |

(Continued)

OTHER PUBLICATIONS $3^{rd}$ Generation Partnership Project: TS 25.212 V6. 2.0, Technical Specification Group Radio Access Network; Multiplexing and Channel Coding (FDD) (Release 6); Jun. 2004.

(Continued)

*Primary Examiner*—Aung S Moe
*Assistant Examiner*—Abdullah Riyami
(74) *Attorney, Agent, or Firm*—Hanify & King, PC

(57) ABSTRACT

An error detection method for detecting an error of control information (parameters) of a physical channel and a mobile terminal are provided. In a receive side (mobile terminal), the size of each bit string generated in the transport channel HS-DSCH (High-Speed Downlink Shared Channel) processing (e.g. rate matching processing) in HSDPA (High-Speed Downlink Packet Access) is compared, so that an error of the control information, transmitted from the transmission side (base station) via the physical channel for control information HS-SCCH (High-Speed Shared Control Channel), is detected.

6 Claims, 4 Drawing Sheets

U.S. PATENT DOCUMENTS

| | | | |
|---|---|---|---|
| 2005/0094615 A1* | 5/2005 | Kim et al. | 370/349 |
| 2005/0186981 A1* | 8/2005 | Nishio | 455/522 |
| 2005/0220024 A1* | 10/2005 | Agin et al. | 370/235 |
| 2006/0002484 A1* | 1/2006 | Miyazaki et al. | 375/259 |
| 2006/0126548 A1* | 6/2006 | Sternberg et al. | 370/310 |
| 2006/0179387 A1* | 8/2006 | Taffin et al. | 714/746 |
| 2006/0245455 A1* | 11/2006 | Bossler et al. | 370/522 |
| 2007/0030917 A1* | 2/2007 | Farag | 375/265 |
| 2008/0043683 A1* | 2/2008 | Kwon et al. | 370/335 |
| 2008/0089223 A1* | 4/2008 | Wu et al. | 370/209 |
| 2008/0310352 A1* | 12/2008 | McBeath et al. | 370/329 |

OTHER PUBLICATIONS

3$^{rd}$ Generation Partnership Project; TS 25.214 V6. 2.0, Technical Specification Group Radio Access Network; Physical Layer Procedures (DFF) (Release 6); Jun. 2004.

Interdigital Communications Corporation: "Cl art f i c a t i on of HS-SCCH reception" 3GPP Draft ; R1-040193, 3rd Generation Partnership Project ( 3GPP), Mobile Competence Centre ; 650, Route Des Lucioles ; F-06921 Sophia-Anti Polis Cedex ; France, vol. RAN WG1, no. Malaga, Spain; 20040212, Feb. 12, 2004, XP050098527 [retrieved on Feb. 12, 2004.

3GPP: "3GPP TS 25.321 V5.10.0" 3GPP RAN, Dec. 2004, XP002551099 Retrieved from the Internet: URL: http://www.3gpp.org/ftp/Specs/html-info/25321.htm> * p. 31-p. 37.

3GPP RAN: "3GPP TS 25.212 V5.9.0" 3GPP, Jun. 2004, XP002551100 Retrieved from the internet: URL: http://www.3gpp.org/ftp/Specs/html-info/25212.htm> p. 59-p. 61.

Extended European Search Report dated Oct. 30, 2009 received in corresponding European Patent Application No. 05254614.0-2415/ 1708399.

* cited by examiner

METHOD OF DETECTING ERROR OF CONTROL INFORMATION TO BE TRANSMITTED BY DOWNLINK CHANNEL OF RADIO COMMUNICATION AND MOBILE TERMINAL

BACKGROUND OF THE INVENTION

1. Field of the Invention

The present invention relates to an error detection method for detecting an error of the control information to be transmitted via a downlink channel of radio communication and a mobile terminal, and more particularly to an error detection method for detecting an error of the control information to be transmitted via HS-SCCH of HSPDA, and a mobile terminal.

2. Description of the Related Art

HSDPA (High-Speed Downlink Packet Access) is one high-speed packet transmission technology which is positioned as a 3.5G standard, with respect to the 3G (third generation) standard using W-CDMA, standardized by "Release 5" issued by 3GPP, the 3G system standardization group, in March 2002. In HSDPA, a technology for high-speed scheduling of downlink packets according to such information as the channel quality of the terminal (e.g. portable telephone) and QoS, increasing the speed of shared channels (HS-DSCH: High-Speed Downlink Shared Channel), decreasing delays due to retransmission processing when a communication error occurs (H-ARQ: Hybrid Automatic Repeat Request), is used. In a conventional W-CDMA, a data communication speed of 384 kbps is the upper limit, and increasing the speed under the normal 3G standard of 2 Mbps is the limit, but by using HSDPA, speed can be increased to 14.4 Mbps (downlink) in theory.

An increase in communication speed is basically implemented by automatically selecting a higher speed modulation scheme and encoding scheme according to the status of the radio waves. Specifically, when the status of a radio wave is not good, modulation by low-speed QPSK (Quadrature Phase Shift Keying) with high stability and an encoding scheme with a high error correction capability (low-speed because of high overhead) are automatically selected, and when the status of a radio wave is good, modulation by a faster 16 QAM (16 Quadrature Amplitude Modulation) and an encoding scheme, with low error correction capability (high-speed), are automatically selected. For retransmission control, a hybrid ARQ (Automatic Repeat Request) system is used, so as to suppress the retransmission count when an error is detected.

The downlink in HSDPA is the HS-DSCH (High-Speed Downlink Shared Channel), which allows a plurality of users to share one channel. HS-DSCH is a transport channel, and the corresponding physical channel is comprised of the HS-PDSCH (High-Speed Physical Downlink Shared Channel) and the HS-SCCH (High-Speed Shared Control Channel). HS-PDSCH is a channel for transmitting data, and HS-SCCH is a channel for transmitting control information.

The data transmitted via HS-DSCH (information bits) is encoded (channel coding) by the transmission side (base station), and on the encoded bit string, rate matching processing is performed for mapping onto the physical channels.

FIG. 1 is a diagram depicting a configuration example of the H-ARQ processing unit, which executes the rate matching processing, of the transmission side (base station). The HSDPA performs encoding processing in the H-ARQ processing unit (rate matching processing unit) 1, the turbo encoding unit 10 turbo-encodes the HS-DSCH data (information bit N) to be input, and parallel-outputs three types of signals: system bit Nsys0 (state where information bit N is not processed), parity 1 bit Np10 (state where an information bit is turbo-encoded), and parity 2 bit Np20 (state where an information bit is turbo-encoded and interleave-processed). Among these three types of signals, first rate matching processing is performed on the parity 1 bit Np 10 and the parity 2 bit Np 20 in the first rate matching processing unit 11. Therefore from the first rate matching processing unit 11, the first rate matching-processed parity 1 bit Np1 and first rate matching-processed parity 2 bit Np 2 are output, and these bits are held in the virtual IR buffer 12 once. The system bit Nsys, which is not first rate matching-processed, is also held in the virtual IR buffer 12.

Then second rate matching processing is performed on each bit string Nsys, Np1 and Np2 by the second rate matching unit 13. The system bit Nt, sys, the parity 1 bit Nt, p1 and the parity 2 bit Nt, p2, after second rate matching processing, are converted into serial bit strings Ndata by the parallel-serial conversion unit 14, and are mapped onto the physical channels. In the first rate matching processing, rate matching is performed only for puncture, and rate matching is not performed for repetition. Puncture is a processing for extracting a bit from a bit string at a predetermined cycle, and repetition is a processing for inserting a bit into a bit string at a predetermined cycle.

If the modulation scheme is QPSK, Ndata is 960×P bits, and if 16 QAM, it is 1920×P bits (P: code multiplexer count 1, 2, . . . , 15) and a minimum of 960 bits. The choice between QPSK or 16 QAM is specified by the parameter Xms (modulation scheme information) <1 bit included in the control information of the physical channel HS-SCCH>, and the code multiplex count is calculated by a parameter of HS-SCCH, that is Xccs (channelization-code-set information) <7 bits>.

The range of the size of the virtual IR buffer 12 is 800 bits, 1600 bits, . . . , 14400 bits, 15200 bits, 16000 bits, 17600 bits, . . . , 28800 bits, and 30400 bits, and the size of the virtual IR buffer 12 is specified by a parameter from the higher layer.

The size of the information bit N is a transparent block (TrBLK) size plus a CRC bit (24 bits fixed). The TrBLK size is calculated based on the modulation scheme which is known by the parameter Xtbs (transport-block size information) <6 bits> and the parameter Xms of HS-SCCH and the code multiplex count which is known by the parameter Xcss, and can be a value in the 137 bits-2792 bits range. Therefore the size range of the information bit N is 161 bits-2816 bits, since a 24 bits fixed CRC bit is added.

The receive side (mobile terminal, such as a portable telephone), on the other hand, receives and decodes the HS-DSCH data signal Ndata from the transmission side. For this decoding, the above mentioned various parameters included in the control information of HS-SCCH must be used. In the HS-SCCH, a CRC bit (16 bits fixed) is added, and if an error is not detected in the CRC check, decoding is executed using the parameters included in HS-SCCH, but if an error is detected in the CRC check, decoding is not executed judging the parameters of HS-SCCH as unreliable.

The CRC check has a probability of an error, which is supposed to be detected, but may not be detected, and in theory this probability is $½^{16}$ if the CRC bit is 16 bits. In this case, the data must not be decoded since the parameters of the HS-SCCH are unreliable. In other words, a parameter error of HS-SCCH must be detected by a means which is different from the CRC check.

SUMMARY OF THE INVENTION

With the foregoing in view, it is an object of the present invention to provide an error detection method for detecting an error of control information (parameters) of a physical channel separately from the CRC check, and a mobile terminal for executing this error detection method.

To achieve the above object, the first error detection method of the present invention is an error detection method for control information to be transmitted by a physical channel for control information corresponding to a physical channel for data from a base station to a mobile terminal, wherein the base station performs rate matching processing on information bits, which are data, to convert them into physical channel bits, transmits the physical channel bits via the physical channel for data, and transmits control information on the data via the physical channel for control information, the mobile terminal receives the physical channel bits and the control information, and performs rate dematching processing, which is the reverse processing of rate matching processing, on the physical channel bits using the control information, and the mobile terminal detects an error of the received control information based on a comparison between the physical channel bits determined by the control information and the size of the information bits, and stops the rate dematching processing of the information bits if an error is detected.

In the first error detection method, the mobile terminal detects an error of the received control information if the size of the information bits determined from the control information is smaller than the size of the physical channel determined from the control information.

The second error detection method of the present invention is an error detection method for control information to be transmitted by a physical channel for control information corresponding to a physical channel for data from a base station to a mobile terminal, wherein the base station performs a first rate matching processing and then a second rate matching processing on information bits, which are data, to convert them into physical channel bits, transmits the physical channel bits via the physical channel for data, and transmits control information on the data via the physical channel for control information, the mobile terminal receives the physical channel bits and the control information, performs a second rate dematching processing, which is the reverse processing of the second rate matching processing, and then a first rate dematching processing, which is the reverse processing of the first rate matching processing, on the physical channel bits using the control information, the mobile terminal detects an error of the received control information based on a comparison between the bit size after the first rate matching processing determined from the control information and the size of the information bits, and stops the first and second rate dematching processings of the information bits if an error is detected.

In the second error detection method, the mobile terminal detects an error of the received control information if the size of the information bits determined from the control information is smaller than the size of the bit after the first rate matching processing determined from the control information.

The third error detection method of the present invention is an error detection method for control information to be transmitted by a physical channel for control information corresponding to a physical channel for data from a base station to a mobile terminal, wherein the base station performs a first rate matching processing on information bits, which are data, temporarily stores the bits after the first rate matching in a buffer memory, then performs second rate matching processing on the stored bits to convert them into physical channel bits, transmits the physical channel bits via the physical channel for data, and transmits control information on the data via the physical channel for control information, the mobile terminal receives the physical channel bits and the control information, performs a second rate dematching processing, which is the reverse processing of the second rate matching processing, on the physical channel bits using the control information, temporarily stores the bits after the second rate dematching processing in a second buffer memory, and performs first rate dematching processing, which is the reverse processing of the first rate matching processing, on the stored bits, and the mobile terminal detects an error of the received control information based on a comparison between the size of the first or second buffer memory which is specified in advance, and the size of the information bits, and stops the first and second dematching processings of the information bits if an error is detected.

In the third error detection method, the mobile terminal detects an error of the received control information if the size of the information bits determined from the control information is smaller than the size of the buffer memory.

To achieve the above object, the mobile terminal of the present invention executes the processing of the mobile terminal in the first, second or third error detection method.

According to the present invention, an error of the control information transmitted via a physical channel can be detected by comparing the sizes of the bit strings before and after rate matching. Therefore even if an error of the control information cannot be detected in the error detection using CRC, which is added to the control information and is transmitted, an error can be detected with certainty by the error detection method of the present invention, and an incorrect decoding of the data can be prevented.

DESCRIPTION OF THE PREFERRED EMBODIMENTS

Embodiments of the present invention will now be described with reference to the drawings. These embodiments, however, shall not restrict the technical scope of the present invention.

In the present invention, a parameter error of HS-SCCH is detected by comparing the size of each bit string generated in HS-DSCH processing (e.g. rate matching processing) of HSDPA in the receive side (mobile terminal).

Figure 1:
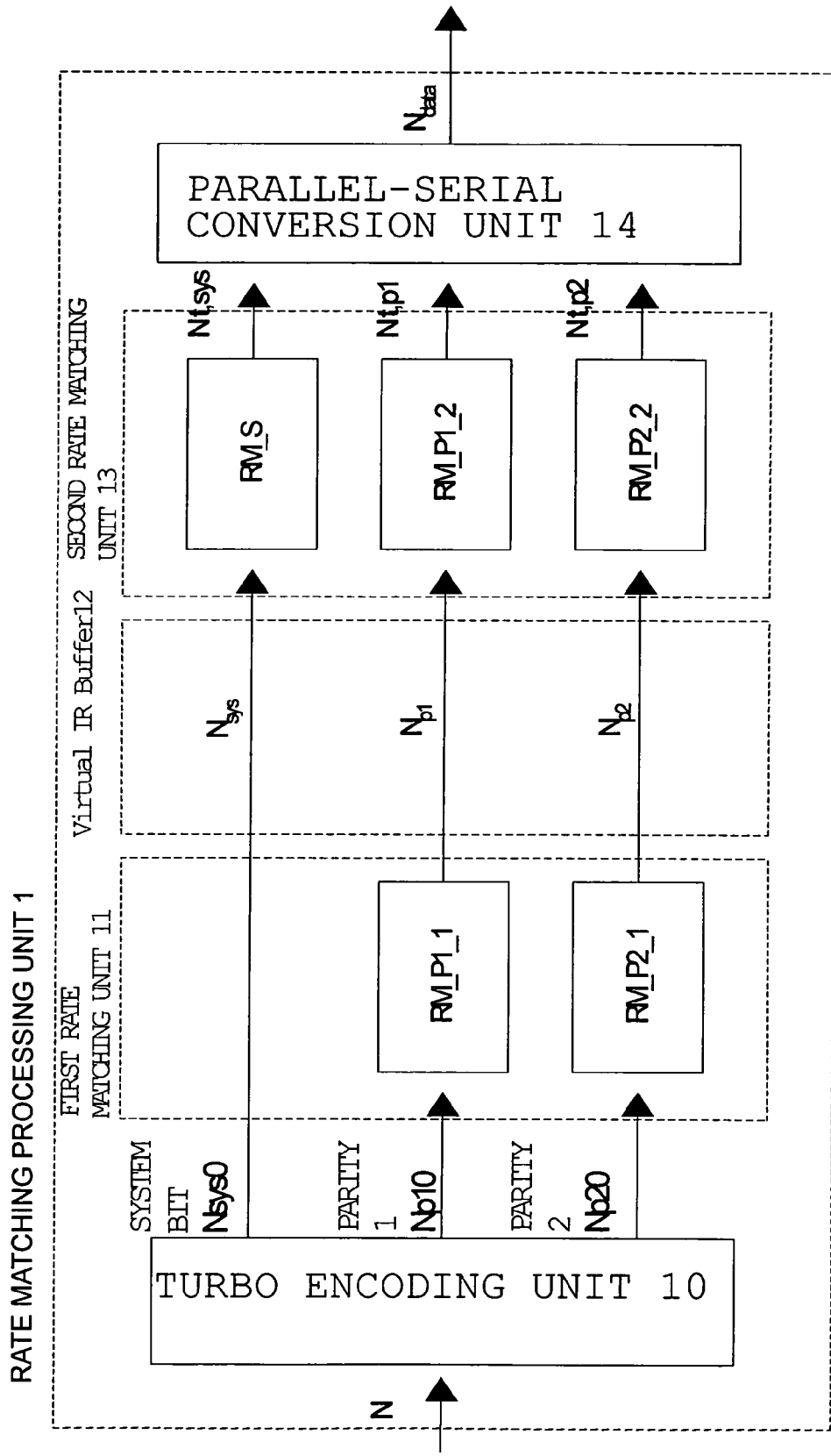
FIG. 1 is a diagram depicting a configuration example of the H-ARQ processing unit to perform rate matching processing of the transmission side (base station)
Figure 2:
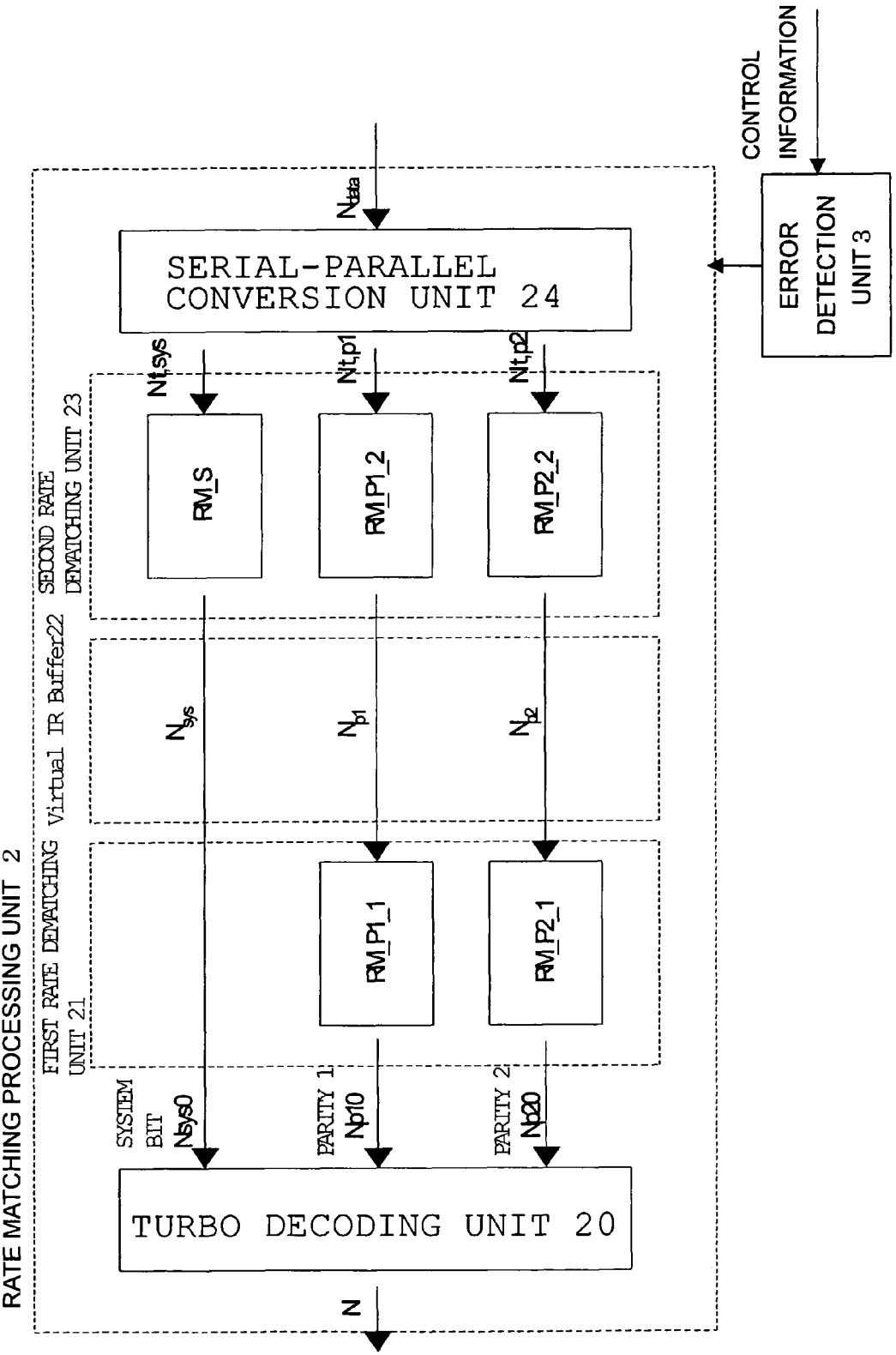
FIG. 2 is a diagram depicting a configuration example of the H-ARQ processing unit to perform rate dematching processing of the receive side (mobile terminal)

FIG. 2 is a diagram depicting a configuration example of the rate dematching processing unit 2 which performs the rate dematching of the receive side (mobile terminal). The configuration in FIG. 2 is almost identical to the configuration in FIG. 1, but signals are transmitted on paths in the reverse direction.

Specifically, the serial bit string mapped onto the physical channel (physical channel bits) Ndata is converted into system bit Nt, sys, parity 1 bit Nt, p1 and parity 2 bit Nt, p2 by the serial-parallel conversion unit 24. Second rate dematching is performed on the system bit Nt, sys, parity 1 bit Nt, p1 and parity 2 bit Nt, p2 by the second rate dematching unit 23. The rate dematching processing is the reverse processing of the rate matching processing, and is a processing for supplementing the bits punctured in the rate matching processing at the transmission side, and extracting the bits repeated therein. The second rate dematch-processed system bit Nsys, parity 1 bit Np1 and parity 2 bit Np2 are held in the virtual IR buffer 22. The sizes of the virtual IR buffer 12 at the transmission side and the virtual IR buffer 22 at the receive side are set to be the same.

Then first rate dematching processing is performed on parity 1 bit Np1 and parity 2 bit Np2 by the first rate dematching unit 21, and the result is input to the turbo decoding unit 20. The system bit Nsys is input to the turbo decoding unit 20 without the first rate dematching processing.

The turbo decoding unit 20 turbo-decodes the system bit Nsys0, parity 1 bit Np10 and parity 2 bit Np20 by the turbo decoding unit 20, and outputs the result as information bit (data bit) N. This series of processings are processings of the transport channel, that is HS-DSCH, just like the transmission side.

When a radio signal from the transmission side is received, the mobile terminal at the receive side transfers the data signal from the physical channel (HS-PDSCH) to the transport channel (HS-DSCH), and performs HS-DSCH processing such as the above mentioned rate dematching processing and turbo decoding processing. On the other hand, the mobile terminal extracts the parameters required for the HS-DSCH processing of the data signal from the received control information of the physical channel HS-SCCH. The mobile terminal can calculate the sizes of each bit string generated in the steps of HS-DSCH processing (e.g. rate dematching processing), that is Nt, sys, Nt, p1, Nt, p2, Nsys, Np1, Np2 and N from the extracted parameters. The size of the Ndata is also calculated from the extracted parameters.

The parameters to be extracted from the control information of HS-SCCH are, for example, Xccs (7 bits), Xms (1 bit), Xtbs (6 bits) and Xrv (3 bits).

Xcss (channelization-code-set information) has information on the code multiplex count P, and Xms (modulation scheme information) has information on the modulation scheme (16 QAM/QPSK). The bit length per one sub-frame (2 ms) of one code is 16 QAM 1920 bits, and QPSK 960 bits respectively, so Ndata=1920×P (16 QAM) and 960×P (QPSK).

Xtbs (transport-block size information) has information on the size of the block of the transport channel (TrBLK). The information bit N is comprised of TrBLK and a CRC bit, and the CRC bit is 24 bits fixed, so information bit N=TrBLK+24.

It is preferable that the correspondence of the combination of Xtbs, Xccs and Xms and TrBLK is stored, and TrBLK is determined from this correspondence, but TrBLK may be determined based on Xtbs, without using the information of Xccs and Xms.

For example Xtbs and TrBLK are uniquely associated and the correspondence thereof is stored, and TrBLK is determined based on this stored information.

The information bit N is rate matching-processed at the transmission side, converted into Ndata, and is transmitted, but if the bit length (size) of Ndata is decreased to be less than the bit length of the information bit N, then the receive side cannot decode the information bits N from the received Ndata. Therefore the bit length of Ndata to be transmitted must be the size of the information bit N or more. In other words, as a result of the first rate matching processing and the second rate matching processing at the transmission side, $$N \leq N \text{ data} \quad (1)$$

must be established.

Normally rate matching processing is performed so as to satisfy the conditions of the above Expression (1), but if an error is generated in the control information to be transmitted via the physical channel for control information HS-SCCH, the parameters to be included in the control information have abnormal values, and Expression (1) may not be satisfied at the receive side.

In the above embodiment, the mobile terminal has an error detection processing unit 3 (see FIG. 2) for judging whether the conditions of the above Expression (1) are satisfied (see FIG. 2), so even if an error, which was generated to the control information, could not be detected by a CRC check at the receive side, the error of the control information is detected with certainty by the processing of the error detection processing unit 3.

Figure 3:
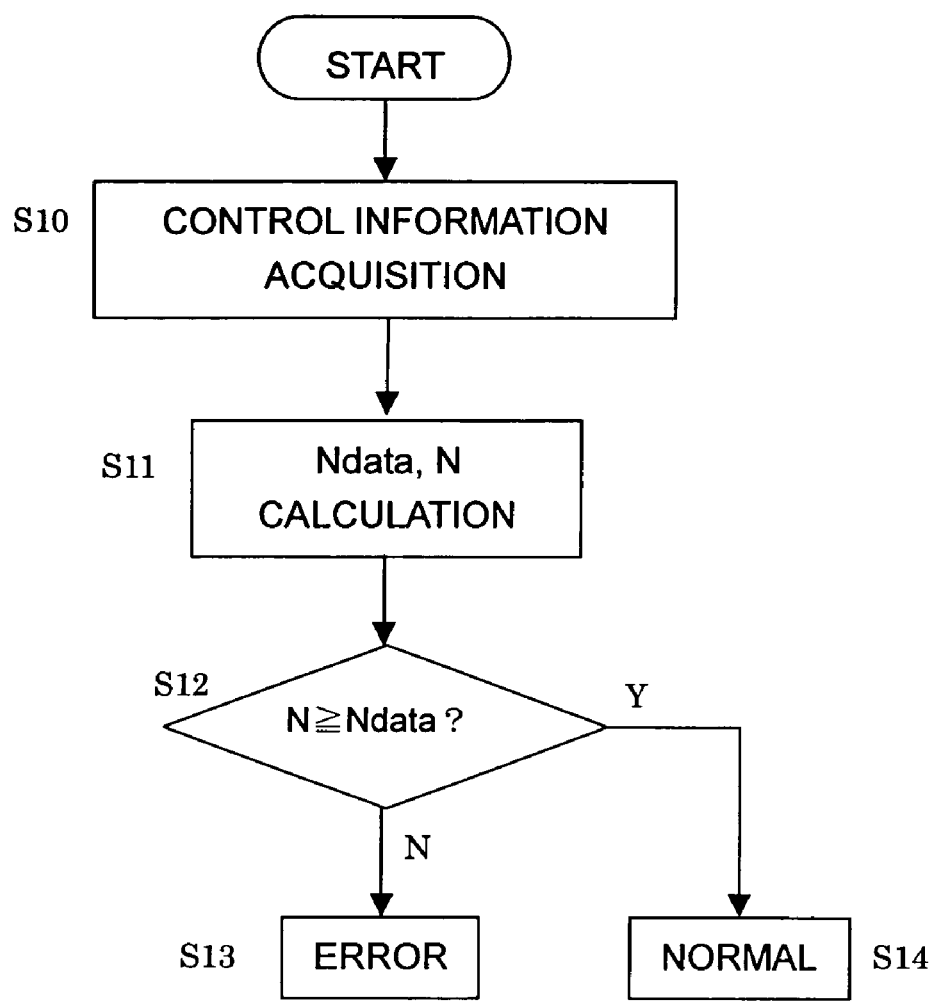
FIG. 3 is a first flow chart depicting the processing of the error detection processing 3.

FIG. 3 is a first flow chart depicting the processing of the error detection processing unit 3. The error detection processing unit 3 acquires the control information to be received by the mobile terminal at the receive side (S10), and calculates and determines the sizes of the Ndata and the information bit N using this control information (S11). The determined sizes are compared (S12), and if these sizes do not satisfy the above Expression (1), it is judged as an error of the control information regardless the result of the CRC check (S13), so that the rate dematching processing and the decode processing of the rate dematching processing unit 2 are not executed. If these sizes satisfy the above Expression (1), it is judged as normal (S14), and if no error is detected in the CRC check as well, the rate dematching processing and the decode processing are executed.

Now the rest of the parameters to be extracted from the control information of HS-SCCH will be described. Xrv (redundancy and constellation version: redundancy version) has information on the position of the punctured bit and the repeated bit in the second rate matching. From the sizes of the parameters Xrv and Ndata, the sizes of the system bit Nt, sys, parity 1 bit Nt, p1 and parity 2 bit Nt, p2, after second rate matching processing, are determined.

The system bit Nsys, parity 1 bit Np1 and parity 2 bit Np2, after the first rate matching processing at the transmission side, may be determined as follows using the system bit Nsys0, parity bit 1 Np10 and parity2 bit Np20 before the first rate matching processing.

Nsys0+Np10+Np20=Ntti. Here Nsys0=Nsys=N+4, Np10=N+4 and Np20=N+4. The system bit Nsys, parity 1 bit Np1 and parity 2 bit Np2 have the size of the respective information bit N plus the tail bits (4 bits). The size of the information bit N is, as described above, information bit N=TrBLK+24.

When the total bit length of the system bit Nsys0, parity 1 bit Np10 and parity 2 bit Np20, before this first rate matching processing, is Ntti, the buffer size of the virtual IR buffer 22 is Nir, and the sizes of the system bit Nsys, parity 1 bit Np1 and parity 2 bit Np2, after the first rate matching processing can be expressed as follows.

If $\Delta N = Nir - Ntti$ $\Delta N1 = \Delta N/2$ $\Delta N2 = \Delta N/2$ ($\Delta N1$ is rounded down, $\Delta N2$ is rounded up, and the reverse is also acceptable)

then

System bit $Nsys = Ntti/3$

Parity 1 bit $Np1 = Ntti/3 + \Delta N1$ (2)

Parity 2 bit $Np2 = Ntti/3 + \Delta N2$ (3)

The system bit Nsys, parity 1 bit Np1, and parity 2 bit Np2 after first rate matching processing are the bit strings held in the virtual IR buffer 22, which has the same buffer size as the virtual IR buffer (Nir=Nsys+Np1+Np2).

If this buffer size is smaller than the size of the information bit N, then the receive side cannot decode the information bit N from the received N data. Also if the bit length becomes less than the information bit length in the stage after the first matching processing, then the receive side cannot decode the information bit N.

Therefore the total bit length of the system bit Nsys, parity 1 bit Np1 and parity 2 bit Np2 after the first rate matching processing must be the size of the information bit N or more. In other words, as a result of the first rate matching processing at the transmission side, $N \leq Nsys + Np1 + Np2$ (4)

must be established.

Normally rate matching processing is performed so as to satisfy the conditions of the above Expression (4), but if an error is generated in the control information to be transmitted via the physical channel for control information HS-SCCH, the parameters to be included in the control information have abnormal values, and Expression (4) may not be satisfied at the receive side. The case when Expression (4) is not satisfied is the case when Np1+Np2 determined by the above Expressions (2) and (3) has a negative value, where if the parity 1 bit Np1 and parity 2 bit Np2, which cannot be negative values in theory, take negative values, then Expression (4) is not satisfied.

According to another embodiment, the error detection unit 3 of the mobile terminal judges whether the conditions of Expression (4) are satisfied, so even if an error, which was generated in the control information, could not be detected by the CRC check at the receive side, the error of the control information is detected with certainty by the processing of the error detection processing unit 3.

Figure 4:
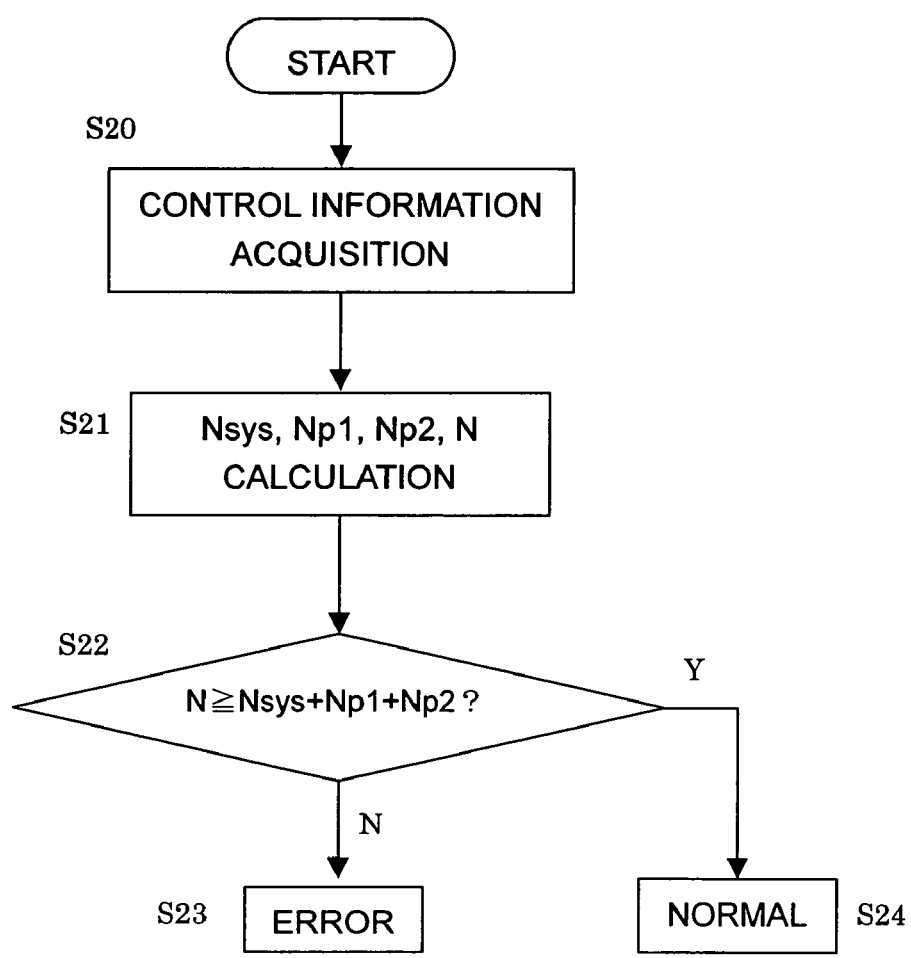
FIG. 4 is a second flow chart depicting the processing of the error detection processing 3.

FIG. 4 is a second flow chart depicting the processing of the error detection processing unit 3. The error detection processing unit 3 acquires the control information to be received by the mobile terminal at the receive side (S20), and calculates and determines the sizes of the system bit Nsys, parity 1 bit Np1 and parity 2 bit Np2, and the size of the information bit N after the first rate matching processing at the transmission side (S21). The total bit length (size) of the system bit Nsys, parity 1 bit Np1 and parity 2 bit Np2 and the size of the information bit N after the first rate matching processing are compared (S22), and if these sizes do not satisfy Expression (4), it is judged as an error of the control information, regardless the result of the CRC check (S23), so that the rate dematching processing and the decode processing of the rate dematching processing unit 2 are not executed. If these sizes satisfy the above Expression (4), it is judged as normal (S24), and if no error is detected in the CRC check as well, the rate dematching processing and the decode processing are executed.

An error may be detected depending on whether the sizes of the parity 1 bit Np1 and the parity 2 bit Np2, calculated in step S21, have negative values.

The total bit length (size) of the system bit Nsys, parity 1 bit Np1 and parity 2 bit Np2, after the first rate matching processing, is the same as the buffer size of the virtual IR buffer, so the sizes may be compared using the buffer size, specified from a higher layer, instead of calculating the size of each bit.

The present invention is not limited to the channel transmission of HSPDA, but can be applied to other channel transmissions in W-CDMA where rate matching processing is performed, and to channel transmission in other radio communication systems.

What is claimed is:

1. An error detection method for control information to be transmitted by a physical channel for control information corresponding to a physical channel for data from a base station to a mobile terminal, comprising the steps of:

said base station performing rate matching processing on information bits, which are data, to convert them into physical channel bits, transmitting said physical channel bits via said physical channel for data, and transmitting control information on said data via said physical channel for control information;

said mobile terminal receiving said physical channel bits and said control information, and performing rate dematching processing, which is the reverse processing of said rate matching processing, on said physical channel bits using said control information; and said mobile terminal detecting an error of said received control information based on a comparison between the size of said physical channel bits determined by said control information and the size of said information bits determined by said control information, and stopping said rate dematching processing of said information bits if said error is detected;

wherein said mobile terminal detects an error of said received control information if the size of said information bits determined from said control information is smaller than the size of said physical channel determined from said control information.

2. An error detection method for control information to be transmitted by a physical channel for control information corresponding to a physical channel for data from a base station to a mobile terminal, comprising the steps of:

said base station performing first rate matching processing and then second rate matching processing on information bits, which are data, to convert them into physical channel bits, transmitting said physical channel bits via said physical channel for data, and transmitting control information on said data via said physical channel for control information;

said mobile terminal receiving said physical channel bits and said control information, performing second rate dematching processing, which is the reverse processing of said second rate matching processing, and then first rate dematching processing, which is the reverse processing of said first rate matching processing, on said physical channel bits using said control information; and said mobile terminal detecting an error of said received control information based on a comparison between the bit size after said first rate matching processing determined from said control information and the size of said information bits determined from said control information, and stopping said first and second rate dematching processings of said information bits if said error is detected;

wherein said mobile terminal detects an error of said received control information if the size of said information bits determined from said control information is smaller than the size of the bit after said first rate matching processing determined from said control information.

3. An error detection method for control information to be transmitted by a physical channel for control information corresponding to a physical channel for data from a base station to a mobile terminal, comprising the steps of:

said base station performing first rate matching processing on information bits, which are data, temporarily stores the bits after said first rate matching processing to a buffer memory, then performing second rate matching processing on said stored bits to convert them into physical channel bits, transmitting said physical channel bits via said physical channel for data, and transmitting control information on said data via said physical channel for control information, said mobile terminal receiving said physical channel bits and said control information, performing second rate dematching processing, which is the reverse processing of said second rate matching processing, on said physical channel bits using said control information, temporarily stores the bits after said second rate dematching processing to a second buffer memory, and performing first rate dematching processing, which is the reverse processing of said first rate matching processing, on said stored bits, and said mobile terminal detecting an error of said received control information based on a comparison between the size of said first or second buffer memory which is specified in advance, and the size of said information bits determined from said control information, and stopping said first and second rate dematching processings of said information bits if said error is detected;

wherein said mobile terminal detects an error of said received control information if the size of said information bits determined from said control information is smaller than the size of said buffer memory.

4. A mobile terminal for receiving physical channel bits, after a base station performs rate matching processing on information bits, which are data, and converts them into physical channel bits, to be transmitted from said base station via a physical channel for data, and for receiving control information on said data to be transmitted via said physical channel for control information corresponding to said physical channel for data, comprising:

a rate dematching processing unit for performing rate dematching processing, which is a reverse processing of said rate matching, on said received physical channel bits, using said control information; and an error detection unit for detecting an error of said received control information based on a comparison between the size of said physical channel bits determined from said control information and the size of said information bits determined from said control information, and stopping the rate dematching processing of said rate dematching processing unit if said error is detected;

wherein said error detection unit detects an error of said received control information if the size of said information bits determined from said control information is smaller than the size of said physical channel determined from said control information.

5. A mobile terminal for receiving physical channel bits, after a base station performs first rate matching processing and then second rate matching processing on information bits, which are data, and converts them into physical channel bits, to be transmitted from said base station via a physical channel for data, and for receiving control information on said data to be transmitted via said physical channel for control information corresponding to said physical channel for data, comprising:

a rate matching processing unit for performing second rate dematching processing, which is the reverse processing of said second rate matching processing, and then performing first rate dematching processing, which is the reverse processing of said first rate matching processing, on said received physical channel bits using said control information; and an error detection unit for detecting an error of said received control information based on a comparison between the bit size after said first rate matching processing determined from said control information and the size of said information bits determined from said control information, and stopping said first and second rate dematching processings of said information bits if said error is detected;

wherein said error detection unit detects an error of said received control information if the size of said information bits determined from said control information is smaller than the bit size after said first rate matching processing determined from said control information.

6. A mobile terminal for receiving physical channel bits, after a base station performs encoding processing and first rate matching processing on information bits, which are data, temporarily stores the bits after said first rate matching processing to a first buffer memory, and performs second rate matching processing on said stored bits to convert them into physical channel bits, to be transmitted from said base station via a physical channel for data, and for receiving control information on said data to be transmitted via said physical channel for control information corresponding to said physical channel for data, comprising:

a rate matching processing unit for performing second rate dematching processing, which is the reverse processing of said second rate matching processing, on said received physical channel bits using said control information, temporarily storing the bits after said second rate dematching processing to a second buffer memory, and performing first rate dematching processing, which is the reverse processing of said first rate matching processing, on said stored bits; and an error detection unit for detecting an error of said received control information based on a comparison between the size of said buffer memory which is specified in advance and the size of said information bits determined from said control information, and stopping said first and second rate dematching processings of said rate matching processing units if said error is detected;

wherein said error detection unit detects an error of said received control information if the size of said information bits determined from said control information is smaller than the size of said buffer memory.

* * * * *